Patented Aug. 1, 1950

2,517,496

UNITED STATES PATENT OFFICE 2,517,496

PREPARATION OF SYMMETRICAL MONOAMINODIHYDROXYTOLUENE

John Krueger, Chicago, Robert Lenhart Hayes, McHenry, and Ruth Marie Guthier, Chicago, Ill., assignors to The Edwal Laboratories, Inc., Chicago, Ill., a corporation of Illinois No Drawing. Application February 2, 1945, Serial No. 575,936

6 Claims. (Cl. 260—575)

Our invention relates to the production of novel aminophenolic compounds from symmetrical triaminotoluene and, more particularly, from hydrochlorides of symmetrical triaminotoluene, especially from the trihydrochloride of symmetrical triaminotoluene. The invention is especially concerned with the preparation of a new symmetrical monoaminodihydroxytoluene, which generally crystallizes in the form of white to pale yellow plates having a melting point in the pure state of about 172 degrees C., and to certain acyl and alkyl derivatives thereof. Such compounds have interesting physiological properties and, in addition, are useful as intermediates for the preparation of pharmaceuticals, dyes, resins, and products for uses in other fields.

We have found that the hydrolysis of symmetrical triaminotoluene, or salts thereof, particularly the trihydrochloride, under certain controlled conditions, hereafter described, results in the production, in excellent yields and in a state of high purity, of a new compound, namely, symmetrical monoaminodihydroxytoluene. We have not, up to the present, ascertained whether said compound is 2-amino-4,6-dihydroxytoluene or 2,6-dihydroxy-4-aminotoluene, but we have characterized it by its melting point of about 172 degrees C. and by the melting point of certain derivatives thereof, all as is set forth hereafter. The novel monoaminodihydroxytoluene compound of our invention crystallizes easily from water to form plates which are very stable when exposed to air.

In the hydrolysis of the symmetrical triaminotoluene, which is carried out in an aqueous medium, we utilize a pH of about 0.1 to about 3.0. Too high a pH should be avoided since resinification products tend to be formed. We prefer to use a pH of about 0.5 to about 1.0. Where the trihydrochloride of symmetrical triaminotoluene is treated, an approximately 10% solution thereof in water has a pH of about 0.7. Where monohydrochlorides or dihydrochlorides of symmetrical triaminotoluene or the free symmetrical triaminotoluene base is utilized as a starting material, sufficient acid may be added to the hydrolysis reaction mixture to bring the same to the desired or optimum pH value, as the case may be. In general, the lower the pH the longer is the period of time for carrying the hydrolysis to the desired extent. When operating at a pH of about 0.7, a reaction period of approximately 3 hours is quite satisfactory, although somewhat shorter or longer periods of time may be utilized, such affecting the yields of the symmetrical monoaminodihydroxytoluene which are obtained.

After the hydrolysis has been completed to the extent desired, which, as indicated above, results substantially in the conversion of two of the amino groups of the symmetrical triaminotoluene to hydroxy groups, the hydrolysate, preferably after filtration, especially where a decolorizing agent such as activated carbon is utilized, is evaporated to dryness, preferably in vacuo. This step is particularly advantageous in insuring the avoidance of contamination of the desired product by ammonium chloride, which latter is formed in the hydrolysis step and which might otherwise tend to become associated with the desired symmetrical monoaminodihydroxytoluene as a result of the subsequent steps of the process. The residue is then extracted with a solvent in which the hydrochloride of the symmetrical monoaminodihydroxytoluene is soluble and in which ammonium chloride is insoluble. Ethyl alcohol, particularly anhydrous ethyl alcohol, is very satisfactory for this purpose although other organic solvents, particularly polar organic solvents, having like properties may be utilized. The resulting extract is then treated to recover the symmetrical monoaminodihydroxytoluene. This is conveniently accomplished by evaporating the extract to dryness, preferably in vacuo, followed by taking up the residue in water and admixing therewith an aqueous solution, preferably a strong solution, of an alkali carbonate. The resulting precipitate, which comprises the free symmetrical monoaminodihydroxytoluene base, is recovered by filtration. Any methylphloroglucinol present as an impurity may be removed by extracting the same with ether from an acidic aqueous solution of the crude symmetrical monoaminodihydroxytoluene product. The base may be purified by recrystallization from water. In place of the alkali carbonates, alkalies or alkaline materials generally may be utilized, but alkali metal carbonates, and especially sodium carbonate, are unusually satisfactory.

The novel alkyl and acyl derivatives of the symmetrical monoaminodihydroxytoluene are produced by reacting the same with alkylating and acylating agents, all as is fully described hereafter.

In order that those skilled in the art may more fully understand the nature of the present invention, the following examples are set forth as illustrative. It will be understood that the proportions of reacting ingredients, times of reaction, and the like, may be somewhat varied, as will be clear to those versed in the art in the light of the guiding principles which are disclosed herein.

*Example I*

100 grams of symmetrical triaminotoluene trihydrochloride were added to 1 liter of water, producing a solution having a pH of about 0.7, and the solution was boiled for 3 hours. 10 grams of activated carbon were then added and the mass was then stirred and filtered. The filtrate was evaporated in vacuo and the resulting dry residue was extracted by boiling with five 50 cc. portions of ethyl alcohol, leaving an undissolved residue of about 40 grams of ammonium chloride. The alcoholic extract was evaporated in vacuo, producing a dry residue of about 50 grams. To said residue, 100 cc. of a 20% solution of sodium carbonate were added, whereupon the symmetrical monoaminodihydroxytoluene separated out. The 30 grams thereof which were recovered by filtration had a melting point of 170 degrees C. The product may be recrystallized one or more times from 10 cc. of water, using 0.25 gram of activated carbon, to produce the pure or substantially pure compound, in the form of plates having a slight yellowish tinge, having a melting point of about 172 degrees C.

*Analysis.*—Calculated for $C_7H_9O_2N$: C, 60.43%; H, 6.52%; N, 10.07%. Found: C, 61.2%; H, 6.1%; N, 10.01%.

*Example II*

10 grams of the symmetrical monoaminodihydroxytoluene, produced as described in Example I, were added to 20 grams of acetic acid anhydride at 70 degrees C. A crystalline precipitate formed which was filtered off and recrystallized from 50 cc. of hot water. The resulting compound, symmetrical monoacetylaminodihydroxytoluene, in the form of white prismatic needles, melted at 204 degrees C. to 205 degrees C.

*Analysis.*—Calculated for $C_9H_{11}O_3N$: C, 59.66%; H, 6.12%; N, 7.71%. Found: C, 59.6%; H, 6.3%; N, 7.4%.

*Example III*

5 grams of the symmetrical monoacetylaminodihydroxytoluene, produced as described in Example II, were dissolved in 40 cc. of 1/N sodium hydroxide and then reacted with 3 grams of dimethyl sulfate at 65 degrees C. The oily layer of dimethyl sulfate disappeared and a precipitate formed which was filtered off and recrystallized from 60 cc. of hot water to yield symmetrical monoacetylaminodimethoxytoluene, in the form of tiny white needles, melting at 166 degrees C. to 168 degrees C.

*Analysis.*—Calculated for $C_{11}H_{15}O_3N$: C, 63.14%; H, 7.23%; N, 6.69%. Found: C, 63.2%; H, 7.0%; N, 6.6%.

In the acyl derivative illustrated by symmetrical monoacetyldihydroxytoluene, it will be seen that there are two free hydroxy groups which are available for further syntheses. In the product of Example III, namely, symmetrical monoacetylaminodimethoxytoluene, it will be observed that the hydroxyl groups are "muzzled," thus leaving the acetylamino group as the only reactive functional group and which, after hydrolysis to convert the same to the amino group, is free for further syntheses.

While, in the examples set forth above, we have disclosed the use of dimethyl sulfate and acetic anhydride as alkylating and acylating agents, respectively, it will be understood that, in place thereof, we may employ other alkylating agents such as diethyl sulfate, ethylene chlorhydrin, methyl iodide, and the like; and other acylating agents such as the acyl halides of propionic acid, butyric acid, caproic acid, and lauric acid, and the anhydrides of maleic acid, succinic acid, phthalic acid, and the like.

While, as previously indicated, we prefer to treat hydrochlorides of the symmetrical triaminotoluene, other salts thereof may be utilized such as, for example, sulphates. Similarly, the hydrolysis of the symmetrical triaminotoluene may be carried out in an acid medium other than that of hydrochloric acid, sulphuric and other acids being satisfactory.

In view of the foregoing, it will be seen that the novel chemical compounds produced in accordance with our invention may be represented by the formula

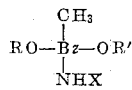

wherein Bz is a benzene radical, X is a member selected from the group consisting of hydrogen and acyl radicals, R and R' are selected from the group consisting of hydrogen and alkyl radicals, and NHX, OR and OR' are symmetrically arranged with respect to each other, the compound when X, R and R' are all hydrogen having a melting point, in the pure state, of about 172 degrees C.

While we have described our invention in detail, it will be understood that the scope thereof is not to be limited other than as set forth in the claims.

What we claim as new and desire to protect by Letters Patent of the United States is:

1. In a method of preparing symmetrical monoaminodihydroxytoluene, the steps which comprise maintaining an aqueous solution of a hydrochloride of symmetrical triaminotoluene at a temperature not substantially below boiling for several hours and until substantially only two of the amino groups of said symmetrical triaminotoluene are converted to hydroxy groups, filtering, evaporating the filtrate to dryness in vacuo, extracting the residue with a solvent in which the hydrochloride of the monoaminodihydroxytoluene is soluble and in which ammonium chloride is insoluble, evaporating the resulting extract to dryness in vacuo, admixing said residue with an aqueous solution of an alkali, and recovering the resulting symmetrical monoaminodihydroxytoluene.

2. In a method of preparing symmetrical monoaminodihydroxytoluene, the steps which comprise maintaining an aqueous solution of symmetrical triaminotoluene trihydrochloride at approximately boiling temperature for several hours and until substantially only two of the amino groups of said symmetrical triaminotoluene are converted to hydroxy groups, filtering, evaporating the filtrate to dryness in vacuo, extracting the residue with ethyl alcohol, evaporating the resulting extract to dryness in vacuo, admixing said residue with an aqueous solution of sodium carbonate, and recovering the resulting symmetrical monoaminodihydroxytoluene.

3. In a method of preparing symmetrical monoaminodihydroxytoluene, the steps which comprise heating an aqueous solution of symmetrical triaminotoluene at a pH of about 0.1 to about 3.0 at approximately boiling temperature for several hours and until substantially only two of the amino groups of said symmetrical triaminotoluene are converted to hydroxy groups, filtering, evaporating the filtrate to dryness in vacuo, and extracting the residue with a solvent in which the resulting salt of the monoaminodihydroxytoluene is soluble and in which the corresponding ammonium salt is insoluble, evaporating the resulting extract to dryness in vacuo, admixing said residue with an aqueous solution of an alkali metal carbonate, and recovering the resulting symmetrical monoaminodihydroxytoluene.

4. In a method of preparing symmetrical monoaminodihydroxytoluene, the steps which comprise heating an aqueous solution of symmetrical triaminotoluene at a pH of about 0.1 to about 3.0 at approximately boiling temperature for several hours and until substantially only two of the amino groups of said symmetrical triaminotoluene are converted to hydroxy groups, filtering, evaporating the filtrate to dryness in vacuo, and extracting the residue with a solvent in which the resulting salt of the monoaminodihydroxytoluene is soluble and in which the corresponding ammonium salt is insoluble.

5. In a method of preparing symmetrical monoaminodihydroxytoluene, the steps which comprise maintaining an aqueous solution of symmetrical triaminotoluene trihydrochloride at approximately boiling temperature for several hours and until substantially only two of the amino groups of said symmetrical triaminotoluene are converted to hydroxy groups, filtering, evaporating the filtrate to dryness in vacuo, and extracting the residue with a solvent in which the hydrochloride of the monoaminodihydroxytoluene is soluble and in which ammonium chloride is insoluble.

6. In a method of preparing symmetrical monoaminodihydroxytoluene, the steps which comprise maintaining an aqueous solution of symmetrical triaminotoluene trihydrochloride at approximately boiling temperature for several hours and until substantially only two of the amino groups of said symmetrical triaminotoluene are converted to hydroxy groups, filtering, evaporating the filtrate to dryness in vacuo, and extracting the residue with ethyl alcohol.

JOHN KRUEGER.
ROBERT LENHART HAYES.
RUTH MARIE GUTHIER.

REFERENCES CITED

The following references are of record in the file of this patent:

UNITED STATES PATENTS

| Number | Name | Date |
| --- | --- | --- |
| 1,492,094 | Beilouss | Apr. 29, 1924 |

FOREIGN PATENTS

| Number | Country | Date |
| --- | --- | --- |
| 103,683 | Germany | May 9, 1899 |
| 479,865 | Great Britain | Feb. 1938 |

OTHER REFERENCES

Lasser-Cohn, "Manual of Organic Chemistry," translated by Alexander Smith (McMillan & Co., N. Y., 1896), pages 9 to 11, 36–37, 56 and 62.

Beilstein, Handbuch der Org. Chem., vol. VI, 1923, page 1109.

Chem. Abstracts, vol. 24 (1930), page 4283.

Gilman and Blatt, "Organic Synthesis," vol. 1, pages 50 and 455 to 457 (John Wiley & Sons, Inc., N. Y. 1941).